US012424152B2

(12) United States Patent
Chae et al.

(10) Patent No.: US 12,424,152 B2
(45) Date of Patent: Sep. 23, 2025

(54) LED DISPLAY DEVICE, AND METHOD FOR CALIBRATING LED DISPLAY DEVICE

(71) Applicant: LG ELECTRONICS INC., Seoul (KR)

(72) Inventors: Myoungsuk Chae, Seoul (KR); Jongmyeong Lim, Seoul (KR); Byungchang Cha, Seoul (KR); Geunyong Kim, Seoul (KR); Younggu Chung, Seoul (KR); Sungjin Kang, Seoul (KR); Sangkyu Kang, Seoul (KR); Haktae Kim, Seoul (KR); Kyuheon Lee, Seoul (KR); Seungho Ryoo, Seoul (KR); Sangtae Park, Seoul (KR); Jonggon Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/709,190

(22) PCT Filed: Nov. 11, 2022

(86) PCT No.: PCT/KR2022/017741
§ 371 (c)(1),
(2) Date: May 10, 2024

(87) PCT Pub. No.: WO2023/085844
PCT Pub. Date: May 19, 2023

(65) Prior Publication Data
US 2025/0046232 A1 Feb. 6, 2025

(30) Foreign Application Priority Data
Nov. 11, 2021 (KR) ........................ 10-2021-0155056

(51) Int. Cl.
*G09G 3/32* (2016.01)
*G09G 3/00* (2006.01)

(52) U.S. Cl.
CPC ............... *G09G 3/32* (2013.01); *G09G 3/035* (2020.08); *G09G 2320/0242* (2013.01); *G09G 2320/0666* (2013.01); *G09G 2320/0693* (2013.01)

(58) Field of Classification Search
CPC ........... G09G 3/32–3291; G09G 3/035; G09G 2320/0242; G09G 2320/0666; G09G 2320/0693
See application file for complete search history.

(56) References Cited

U.S. PATENT DOCUMENTS 6,414,661 B1 * 7/2002 Shen .................... G09G 3/3208 345/82
10,147,392 B2 * 12/2018 Jung ........................ G09G 3/32
(Continued)

FOREIGN PATENT DOCUMENTS

KR 10-2015-0048967 A 5/2015
KR 10-1696609 B1 1/2017
(Continued)

*Primary Examiner* — Gene W Lee
(74) *Attorney, Agent, or Firm* — Birch, Stewart, Kolasch & Birch, LLP

(57) ABSTRACT

A method for calibrating a LED display device, according to one embodiment of the present invention, comprises the steps of: providing one module composed of a plurality of pixels; providing a cabinet composed of a plurality of modules; providing an LED display device composed of a plurality of cabinets; and calibrating by cell unit, which is larger than the size of the pixel and is smaller than the size of one module.

12 Claims, 19 Drawing Sheets

(56) References Cited

U.S. PATENT DOCUMENTS

| | | | | |
|---|---|---|---|---|
| 10,510,289 | B2 * | 12/2019 | Wang | G09G 3/20 |
| 10,572,208 | B2 * | 2/2020 | Park | G06F 3/1446 |
| 11,036,457 | B2 * | 6/2021 | Park | G09G 3/3426 |
| 11,145,249 | B1 * | 10/2021 | Han | G09G 3/32 |
| 11,561,751 | B2 * | 1/2023 | Park | G06F 3/1446 |
| 11,721,264 | B2 * | 8/2023 | Lee | G06F 3/1446 345/207 |
| 2012/0038660 | A1 * | 2/2012 | Han | G09G 3/2003 345/590 |
| 2018/0225075 | A1 * | 8/2018 | Park | G09G 3/3233 |

FOREIGN PATENT DOCUMENTS

| | | | |
|---|---|---|---|
| KR | 10-2017-0042846 | A | 4/2017 |
| KR | 10-1936328 | B1 | 4/2019 |
| KR | 10-2020-0066831 | A | 6/2020 |
| KR | 10-2020-0074645 | A | 6/2020 |
| WO | 2021/210893 | A1 | 10/2021 |

* cited by examiner

LDM is adjusted to uniform value and
adjusted area differs depending on LDM type (a)

Cabinet is divided into small cells and corrected
by applying different RGB gain value to each area (b)

(a)

(b)

LDM is adjusted to uniform value and
adjusted area differs depending on LDM type (a)

Cabinet is divided into small cells and corrected
by applying different RGB gain value to each area (b)

LED DISPLAY DEVICE, AND METHOD FOR CALIBRATING LED DISPLAY DEVICE

CROSS REFERENCE TO RELATED APPLICATIONS

This application is the National Phase of PCT International Application No. PCT/KR2022/017741, filed on Nov. 11, 2022, which claims priority under 35 U.S.C. 119(a) to Patent Application No. 10-2021-0155056, filed in Republic of Korea on Nov. 11, 2021, all of which are hereby expressly incorporated by reference into the present application.

TECHNICAL FIELD

The present disclosure relates to a display device. More specifically, the present disclosure is applicable to, for example, any type of light-emitting diode (LED) display device on which calibration is performed.

BACKGROUND ART

In the field of display technology, display devices having excellent characteristics such as thinness, flexibility, and the like have been developed.

A light-emitting diode (LED), which is a well-known semiconductor light-emitting element that converts electric current into light, has been used as a light source for a display image of an electronic device including an information and communication device along with a GaP:N-based green LED, starting with commercialization of a red LED using a GaAsP compound semiconductor in 1962. Accordingly, a method for solving problems by implementing a display using the semiconductor light-emitting element may be proposed. The semiconductor light-emitting element has various advantages such as long lifespan, low power consumption, excellent initial driving characteristics, and high vibration resistance, over a filament-based light-emitting element.

Meanwhile, when a display device made of the above-mentioned LED outputs, for example, PowerPoint (PPT), etc. for a long time, there is a problem with a color difference between modules of the display device, and even when a video is played, there is a problem with a color difference between modules of the display device.

To solve these problems, calibration is performed on each module constituting the display device. However, according to the prior art, since an average RGB value is used for one module, a camera recognizes modules with substantially different color differences as modules with the same color, thereby resulting in a calibration error.

DISCLOSURE

Technical Problem

An embodiment of the present disclosure is to solve the problems of the prior art in which calibration is performed based on a module of a display device.

Another embodiment of the present disclosure is to uniformly maintain an overall color difference of a screen by applying calibration based on a cell which is a smaller unit than a module.

Another embodiment of the present disclosure is to extract an optimal cell size for calibration.

The objects that can be achieved with the present disclosure are not limited to what has been particularly described hereinabove and other objects not described herein will be more clearly understood by persons skilled in the art from the following detailed description.

Technical Solution

According to an aspect of the present disclosure, provided herein is a method of performing calibration on a light-emitting diode (LED) display device, including providing one module including a plurality of pixels, providing a cabinet including a plurality of modules, providing the LED display device including a plurality of cabinets, and performing calibration based on a cell which is larger than a size of a pixel and smaller than a size of the one module.

Further, 128 (=16×8) or 144 (=16×9) cells each serving as a basic unit of the calibration may be included in the one module.

A size of the cell, which is a basic unit of the calibration, may be determined by at least one camera.

The size of the cell, which is the basic unit of the calibration, may be changed by resolution of the camera, an angle of view of a lens of the camera, or a screen area of the LED display device captured by the camera.

For example, the size of the cell, which is the basic unit of the calibration, may become smaller as the resolution of the camera increases.

For example, the size of the cell, which is the basic unit of the calibration, may become smaller as the angle of view of the lens of the camera increases.

For example, the size of the cell, which is the basic unit of the calibration, may increase as the screen area of the LED display device increases.

According to another aspect of the present disclosure, provided herein is a light-emitting diode (LED) display device, including one module including a plurality of pixels, a cabinet including a plurality of modules, and one screen including a plurality of cabinets. Calibration is performed based on a cell which is larger than a size of a pixel and smaller than a size of the one module.

Advantageous Effects

An embodiment of the present disclosure may solve the problems of the prior art in which calibration is performed based on a module of a display device.

Another embodiment of the present disclosure has a technical effect of uniformly maintaining an overall color difference of a screen by applying calibration based on a cell which is a smaller unit than a module.

Another embodiment of the present disclosure has the advantage of extracting an optimal cell size for calibration.

The effects that can be achieved with the present disclosure are not limited to what has been particularly described hereinabove and other advantages not described herein will be more clearly understood by persons skilled in the art from the following detailed description of the present disclosure.

BRIEF DESCRIPTION OF DRAWINGS

The accompanying drawings, which are included to provide a further understanding of the disclosure, illustrate embodiments of the disclosure and together with the description serve to explain the principle of the disclosure.

BEST MODE

Reference will now be made in detail to embodiments of the present disclosure, examples of which are illustrated in the accompanying drawings. Wherever possible, the same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions. In describing embodiments disclosed in this specification, relevant well-known technologies may not be described in detail in order not to obscure the subject matter of the embodiments disclosed in this specification. In addition, it should be noted that the accompanying drawings are only for easy understanding of the embodiments disclosed in the present specification, and should not be construed as limiting the technical spirit disclosed in the present specification.

Furthermore, although the drawings are separately described for simplicity, embodiments implemented by combining at least two or more drawings are also within the scope of the present disclosure.

In addition, when an element such as a layer, region or module is described as being "on" another element, it is to be understood that the element may be directly on the other element or there may be an intermediate element between them.

The display device described herein is a concept including all display devices that display information with a unit pixel or a set of unit pixels. Therefore, the display device may be applied not only to finished products but also to parts. For example, a panel corresponding to a part of a digital TV also independently corresponds to the display device in the present specification. The finished products include a mobile phone, a smartphone, a laptop, a digital broadcasting terminal, a personal digital assistant (PDA), a portable multimedia player (PMP), a navigation system, a slate PC, a tablet, an Ultrabook, a digital TV, a desktop computer, and the like.

However, it will be readily apparent to those skilled in the art that the configuration according to the embodiments described herein is applicable even to a new product that will be developed later as a display device.

In addition, the semiconductor light emitting element mentioned in this specification is a concept including an LED, a micro LED, and the like.

Figure 1:
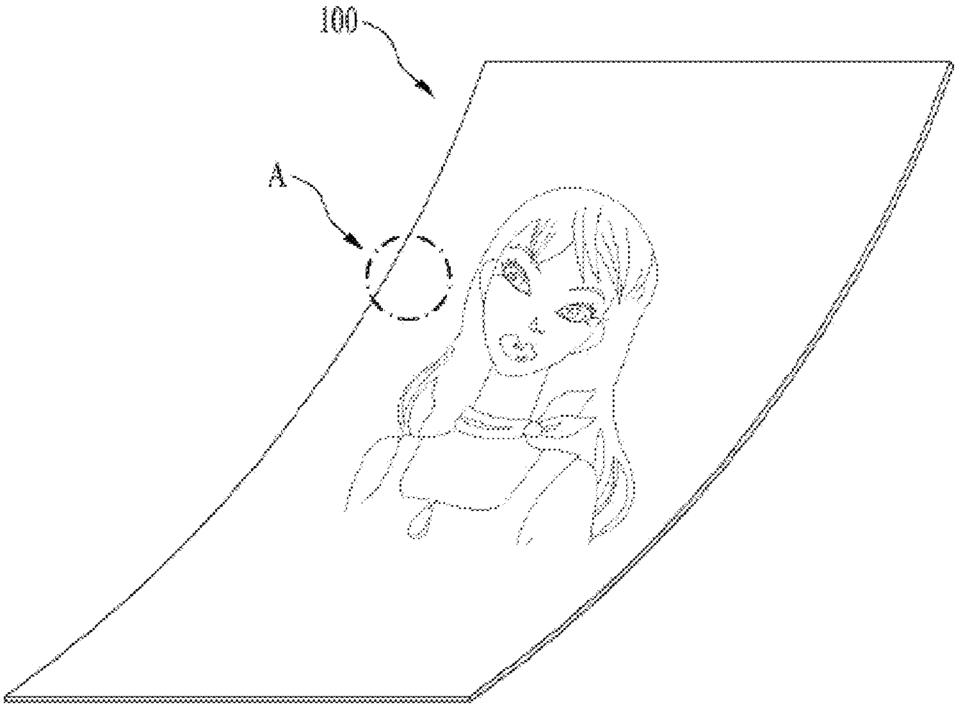
FIG. 1 is a conceptual diagram illustrating an embodiment of a display device using a semiconductor light emitting element according to the present disclosure.

FIG. 1 is a conceptual view illustrating an embodiment of a display device using a semiconductor light emitting element according to the present disclosure.

As shown in FIG. 1, information processed by a controller (not shown) of a display device 100 may be displayed using a flexible display.

The flexible display may include, for example, a display that can be warped, bent, twisted, folded, or rolled by external force.

Furthermore, the flexible display may be, for example, a display manufactured on a thin and flexible substrate that can be warped, bent, folded, or rolled like paper while maintaining the display characteristics of a conventional flat panel display.

When the flexible display remains in an unbent state (e.g., a state having an infinite radius of curvature) (hereinafter referred to as a first state), the display area of the flexible display forms a flat surface. When the display in the first sate is changed to a bent state (e.g., a state having a finite radius of curvature) (hereinafter referred to as a second state) by external force, the display area may be a curved surface. As shown in FIG. 1, the information displayed in the second state may be visual information output on a curved surface. Such visual information may be implemented by independently controlling the light emission of sub-pixels arranged in a matrix form. The unit pixel may mean, for example, a minimum unit for implementing one color.

The unit pixel of the flexible display may be implemented by a semiconductor light emitting element. In the present disclosure, a light emitting diode (LED) is exemplified as a type of the semiconductor light emitting element configured to convert electric current into light. The LED may be formed in a small size, and may thus serve as a unit pixel even in the second state.

Hereinafter, a flexible display implemented using the LED will be described in more detail with reference to the drawings.

Figure 2:
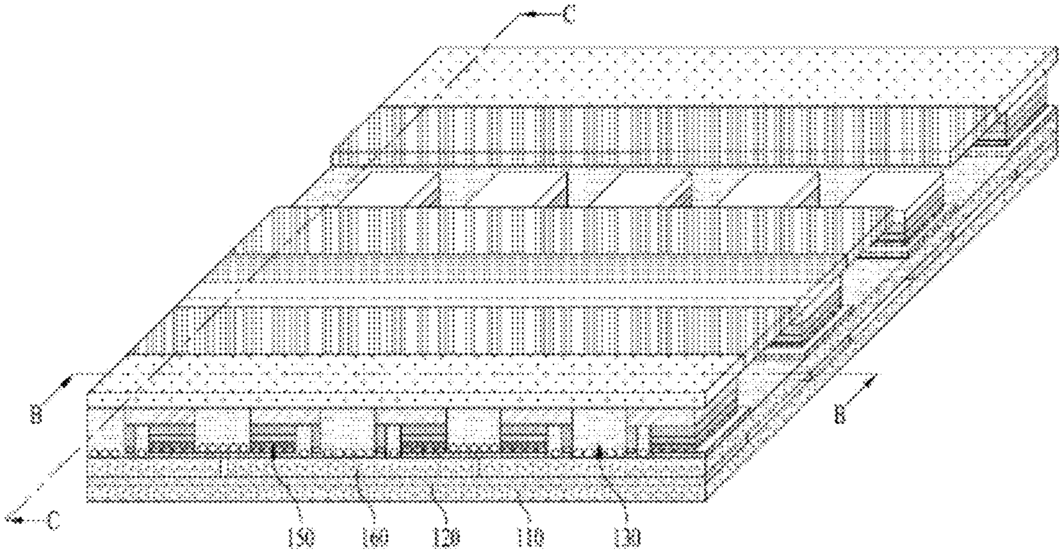
FIG. 2 is a partially enlarged diagram showing a part A shown in FIG. 1.

FIG. 2 is a partially enlarged view showing part A of FIG. 1.

Figure 3A:
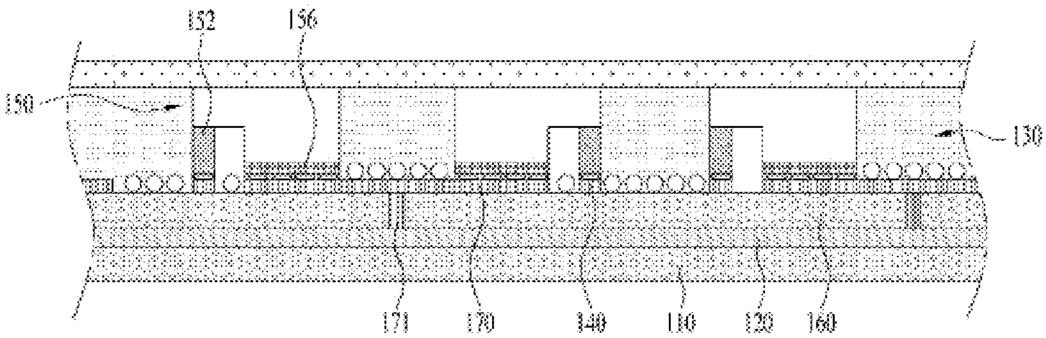
FIGS. 3A and 3B are cross-sectional diagrams taken along the cutting lines B-B and C-C in FIG. 2.
Figure 3B:
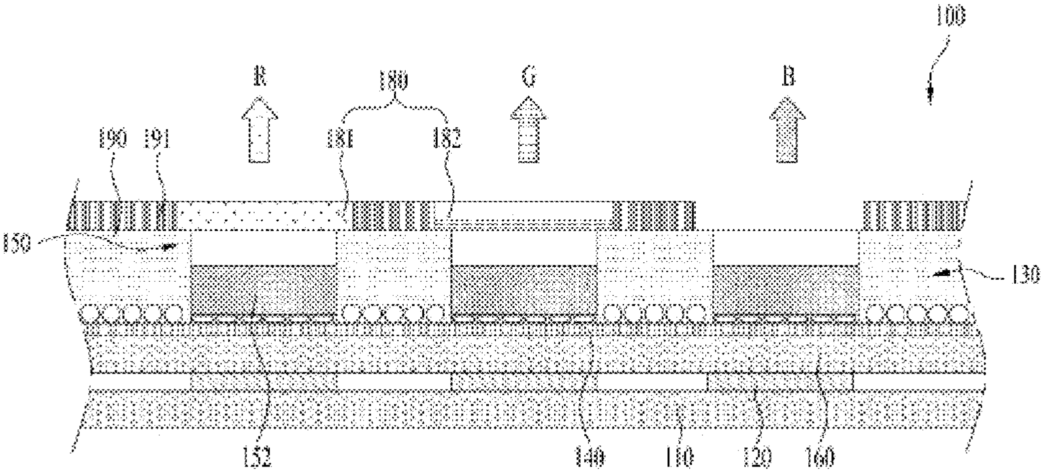

FIGS. 3A and 3B are cross-sectional views taken along lines B-B and C-C in FIG. 2.

Figure 4:
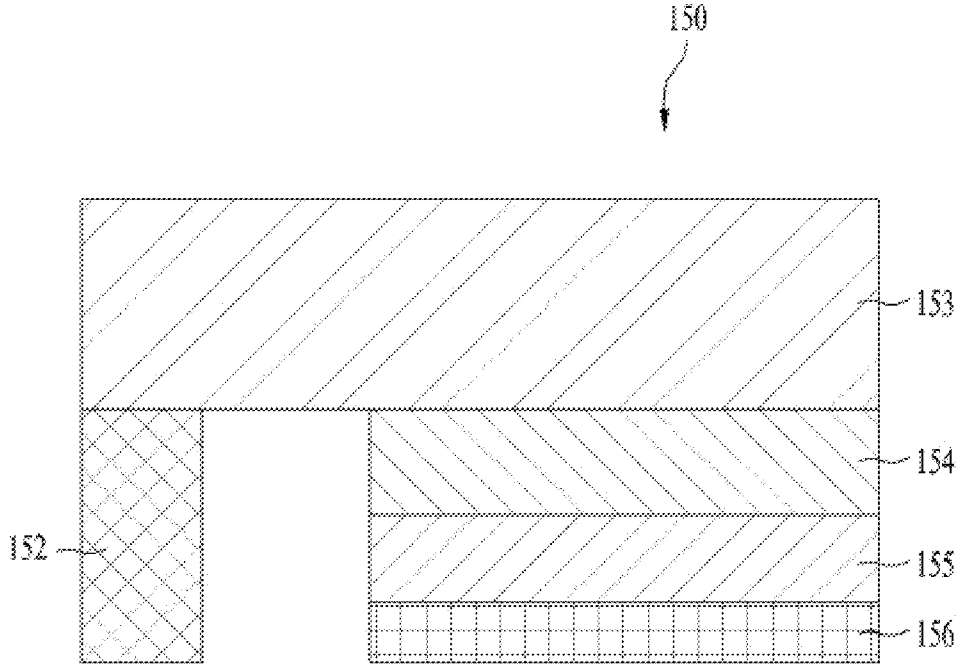
FIG. 4 is a conceptual diagram illustrating the flip-chip type semiconductor light emitting element of FIG. 3.

FIG. 4 is a conceptual view illustrating the flip-chip type semiconductor light emitting element of FIG. 3.

Figure 5A:
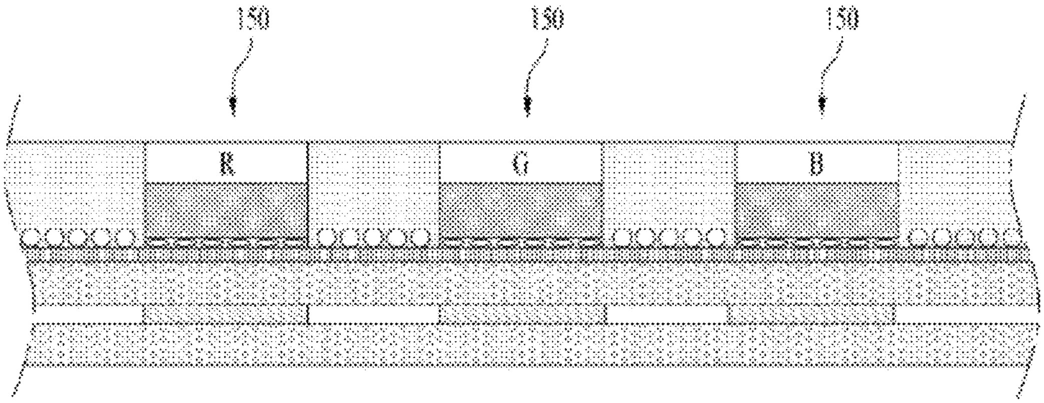
FIGS. 5A to 5C are conceptual diagrams illustrating various examples of color implementation with respect to a flip-chip type semiconductor light emitting element.
Figure 5B:
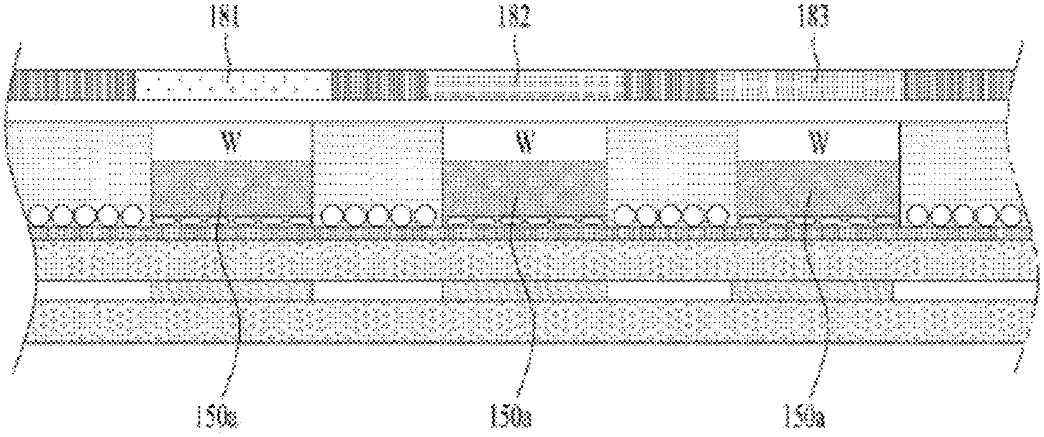
Figure 5C:
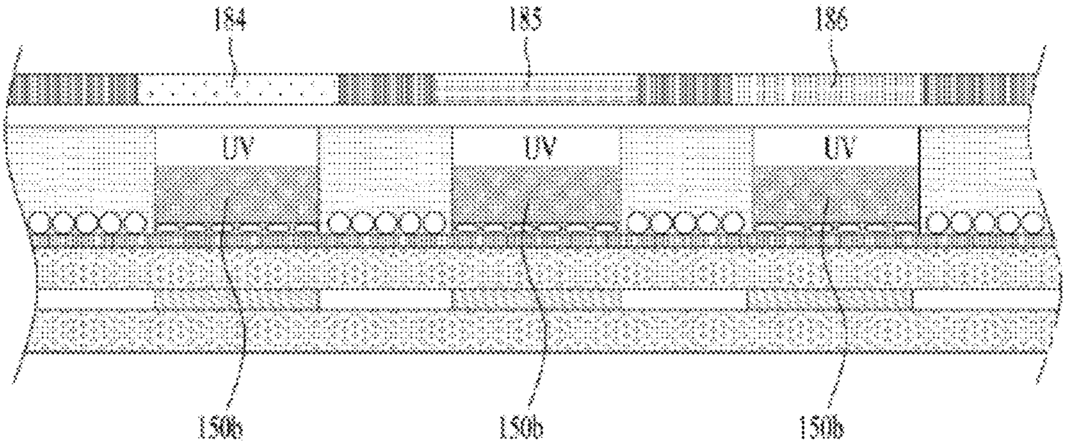

FIGS. 5A to 5C are conceptual views illustrating various examples of implementation of colors in relation to a flip-chip type semiconductor light emitting element.

As shown in FIGS. 2, 3A and 3B, the display device 100 using a passive matrix (PM) type semiconductor light emitting element is exemplified as the display device 100 using a semiconductor light emitting element. However, the examples described below are also applicable to an active matrix (AM) type semiconductor light emitting element.

The display device 100 shown in FIG. 1 may include a substrate 110, a first electrode 120, a conductive adhesive layer 130, a second electrode 140, and at least one semiconductor light emitting element 150, as shown in FIG. 2.

The substrate 110 may be a flexible substrate. For example, to implement a flexible display device, the substrate 110 may include glass or polyimide (PI). Any insulative and flexible material such as polyethylene naphthalate (PEN) or polyethylene terephthalate (PET) may be employed. In addition, the substrate 110 may be formed of either a transparent material or an opaque material.

The substrate 110 may be a wiring substrate on which the first electrode 120 is disposed. Thus, the first electrode 120 may be positioned on the substrate 110.

As shown in FIG. 3A, an insulating layer 160 may be disposed on the substrate 110 on which the first electrode 120 is positioned, and an auxiliary electrode 170 may be positioned on the insulating layer 160. In this case, a stack in which the insulating layer 160 is laminated on the substrate 110 may be a single wiring substrate. More specifically, the insulating layer 160 may be formed of an insulative and flexible material such as PI, PET, or PEN, and may be integrated with the substrate 110 to form a single substrate.

The auxiliary electrode 170, which is an electrode that electrically connects the first electrode 120 and the semiconductor light emitting element 150, is positioned on the insulating layer 160, and is disposed to correspond to the position of the first electrode 120. For example, the auxiliary electrode 170 may have a dot shape and may be electrically connected to the first electrode 120 by an electrode hole 171 formed through the insulating layer 160. The electrode hole 171 may be formed by filling a via hole with a conductive material.

As shown in FIG. 2 or 3A, a conductive adhesive layer 130 may be formed on one surface of the insulating layer 160, but embodiments of the present disclosure are not limited thereto. For example, a layer performing a specific function may be formed between the insulating layer 160 and the conductive adhesive layer 130, or the conductive adhesive layer 130 may be disposed on the substrate 110 without the insulating layer 160. In a structure in which the conductive adhesive layer 130 is disposed on the substrate 110, the conductive adhesive layer 130 may serve as an insulating layer.

The conductive adhesive layer 130 may be a layer having adhesiveness and conductivity. For this purpose, a material having conductivity and a material having adhesiveness may be mixed in the conductive adhesive layer 130. In addition, the conductive adhesive layer 130 may have ductility, thereby providing making the display device flexible.

As an example, the conductive adhesive layer 130 may be an anisotropic conductive film (ACF), an anisotropic conductive paste, a solution containing conductive particles, or the like. The conductive adhesive layer 130 may be configured as a layer that allows electrical interconnection in the direction of the Z-axis extending through the thickness, but is electrically insulative in the horizontal X-Y direction. Accordingly, the conductive adhesive layer 130 may be referred to as a Z-axis conductive layer (hereinafter, referred to simply as a "conductive adhesive layer").

The ACF is a film in which an anisotropic conductive medium is mixed with an insulating base member. When the ACF is subjected to heat and pressure, only a specific portion thereof becomes conductive by the anisotropic conductive medium. Hereinafter, it will be described that heat and pressure are applied to the ACF. However, another method may be used to make the ACF partially conductive. The other method may be, for example, application of only one of the heat and pressure or UV curing.

In addition, the anisotropic conductive medium may be, for example, conductive balls or conductive particles. For example, the ACF may be a film in which conductive balls are mixed with an insulating base member. Thus, when heat and pressure are applied to the ACF, only a specific portion of the ACF is allowed to be conductive by the conductive balls. The ACF may contain a plurality of particles formed by coating the core of a conductive material with an insulating film made of a polymer material. In this case, as the insulating film is destroyed in a portion to which heat and pressure are applied, the portion is made to be conductive by the core. At this time, the cores may be deformed to form layers that contact each other in the thickness direction of the film. As a more specific example, heat and pressure are applied to the whole ACF, and an electrical connection in the Z-axis direction is partially formed by the height difference of a counterpart adhered by the ACF.

As another example, the ACF may contain a plurality of particles formed by coating an insulating core with a conductive material. In this case, as the conductive material is deformed (pressed) in a portion to which heat and pressure are applied, the portion is made to be conductive in the thickness direction of the film. As another example, the conductive material may be disposed through the insulating base member in the Z-axis direction to provide conductivity in the thickness direction of the film. In this case, the conductive material may have a pointed end.

The ACF may be a fixed array ACF in which conductive balls are inserted into one surface of the insulating base member. More specifically, the insulating base member may be formed of an adhesive material, and the conductive balls may be intensively disposed on the bottom portion of the insulating base member. Thus, when the base member is subjected to heat and pressure, it may be deformed together with the conductive balls, exhibiting conductivity in the vertical direction.

However, the present disclosure is not necessarily limited thereto, and the ACF may be formed by randomly mixing conductive balls in the insulating base member, or may be composed of a plurality of layers with conductive balls arranged on one of the layers (as a double-ACF).

The anisotropic conductive paste may be a combination of a paste and conductive balls, and may be a paste in which conductive balls are mixed with an insulating and adhesive base material. Also, the solution containing conductive particles may be a solution containing any conductive particles or nanoparticles.

Referring back to FIG. 3A, the second electrode 140 is positioned on the insulating layer 160 and spaced apart from the auxiliary electrode 170. That is, the conductive adhesive layer 130 is disposed on the insulating layer 160 having the auxiliary electrode 170 and the second electrode 140 positioned thereon.

After the conductive adhesive layer 130 is formed with the auxiliary electrode 170 and the second electrode 140 positioned on the insulating layer 160, the semiconductor light emitting element 150 is connected thereto in a flip-chip form by applying heat and pressure. Thereby, the semiconductor light emitting element 150 is electrically connected to the first electrode 120 and the second electrode 140.

Referring to FIG. 4, the semiconductor light emitting element may be a flip chip-type light emitting device.

For example, the semiconductor light emitting element may include a p-type electrode 156, a p-type semiconductor layer 155 on which the p-type electrode 156 is formed, an active layer 154 formed on the p-type semiconductor layer 155, an n-type semiconductor layer 153 formed on the active layer 154, and an n-type electrode 152 disposed on the n-type semiconductor layer 153 and horizontally spaced apart from the p-type electrode 156. In this case, the p-type electrode 156 may be electrically connected to the auxiliary electrode 170, which is shown in FIG. 3, by the conductive adhesive layer 130, and the n-type electrode 152 may be electrically connected to the second electrode 140.

Referring back to FIGS. 2, 3A and 3B, the auxiliary electrode 170 may be elongated in one direction. Thus, one auxiliary electrode may be electrically connected to the plurality of semiconductor light emitting elements 150. For example, p-type electrodes of semiconductor light emitting elements on left and right sides of an auxiliary electrode may be electrically connected to one auxiliary electrode.

More specifically, the semiconductor light emitting element 150 may be press-fitted into the conductive adhesive layer 130 by heat and pressure. Thereby, only the portions of the semiconductor light emitting element 150 between the p-type electrode 156 and the auxiliary electrode 170 and between the n-type electrode 152 and the second electrode 140 may exhibit conductivity, and the other portions of the semiconductor light emitting element 150 do not exhibit conductivity as they are not press-fitted. In this way, the conductive adhesive layer 130 interconnects and electrically connects the semiconductor light emitting element 150 and the auxiliary electrode 170 and interconnects and electrically connects the semiconductor light emitting element 150 and the second electrode 140).

The plurality of semiconductor light emitting elements 150 may constitute a light emitting device array, and a phosphor conversion layer 180 may be formed on the light emitting device array.

The light emitting device array may include a plurality of semiconductor light emitting elements having different luminance values. Each semiconductor light emitting element 150 may constitute a unit pixel and may be electrically connected to the first electrode 120. For example, a plurality of first electrodes 120 may be provided, and the semiconductor light emitting elements may be arranged in, for example, several columns. The semiconductor light emitting elements in each column may be electrically connected to any one of the plurality of first electrodes.

In addition, since the semiconductor light emitting elements are connected in a flip-chip form, semiconductor light emitting elements grown on a transparent dielectric substrate may be used. The semiconductor light emitting elements may be, for example, nitride semiconductor light emitting elements. Since the semiconductor light emitting element 150 has excellent luminance, it may constitute an individual unit pixel even when it has a small size.

As shown in FIG. 3, a partition wall 190 may be formed between the semiconductor light emitting elements 150. In this case, the partition wall 190 may serve to separate individual unit pixels from each other, and may be integrated with the conductive adhesive layer 130. For example, by inserting the semiconductor light emitting element 150 into the ACF, the base member of the ACF may form the partition wall.

In addition, when the base member of the ACF is black, the partition wall 190 may have reflectance and increase contrast even without a separate black insulator.

As another example, a reflective partition wall may be separately provided as the partition wall 190. In this case, the partition wall 190 may include a black or white insulator depending on the purpose of the display device. When a partition wall including a white insulator is used, reflectivity may be increased. When a partition wall including a black insulator is used, it may have reflectance and increase contrast.

The phosphor conversion layer 180 may be positioned on the outer surface of the semiconductor light emitting element 150. For example, the semiconductor light emitting element 150 may be a blue semiconductor light emitting element that emits blue (B) light, and the phosphor conversion layer 180 may function to convert the blue (B) light into a color of a unit pixel. The phosphor conversion layer 180 may be a red phosphor 181 or a green phosphor 182 constituting an individual pixel.

That is, the red phosphor 181 capable of converting blue light into red (R) light may be laminated on a blue semiconductor light emitting element at a position of a unit pixel of red color, and the green phosphor 182 capable of converting blue light into green (G) light may be laminated on the blue semiconductor light emitting element at a position of a unit pixel of green color. Only the blue semiconductor light emitting element may be used alone in the portion constituting the unit pixel of blue color. In this case, unit pixels of red (R), green (G), and blue (B) may constitute one pixel. More specifically, a phosphor of one color may be laminated along each line of the first electrode 120. Accordingly, one line on the first electrode 120 may be an electrode for controlling one color. That is, red (R), green (G), and blue (B) may be sequentially disposed along the second electrode 140, thereby implementing a unit pixel.

However, embodiments of the present disclosure are not limited thereto. Unit pixels of red (R), green (G), and blue (B) may be implemented by combining the semiconductor light emitting element 150 and the quantum dot (QD) rather than using the phosphor.

Also, a black matrix 191 may be disposed between the phosphor conversion layers to improve contrast. That is, the black matrix 191 may improve contrast of light and darkness.

However, embodiments of the present disclosure are not limited thereto, and anther structure may be applied to implement blue, red, and green colors.

Referring to FIG. 5A, each semiconductor light emitting element may be implemented as a high-power light emitting device emitting light of various colors including blue by using gallium nitride (GaN) as a main material and adding indium (In) and/or aluminum (Al).

In this case, each semiconductor light emitting element may be a red, green, or blue semiconductor light emitting element to form a unit pixel (sub-pixel). For example, red, green, and blue semiconductor light emitting elements R, G, and B may be alternately disposed, and unit pixels of red, green, and blue may constitute one pixel by the red, green and blue semiconductor light emitting elements. Thereby, a full-color display may be implemented.

Referring to FIG. 5B, the semiconductor light emitting element 150*a* may include a white light emitting device W having a yellow phosphor conversion layer, which is provided for each device. In this case, in order to form a unit pixel, a red phosphor conversion layer 181, a green phosphor conversion layer 182, and a blue phosphor conversion layer 183 may be disposed on the white light emitting device W. In addition, a unit pixel may be formed using a color filter repeating red, green, and blue on the white light emitting device W.

Referring to FIG. 5C, a red phosphor conversion layer 181, a green phosphor conversion layer 185, and a blue phosphor conversion layer 183 may be provided on a ultraviolet light emitting device. Not only visible light but also ultraviolet (UV) light may be used in the entire region of the semiconductor light emitting element. In an embodiment, UV may be used as an excitation source of the upper phosphor in the semiconductor light emitting element.

Referring back to this example, the semiconductor light emitting element is positioned on the conductive adhesive layer to constitute a unit pixel in the display device. Since the semiconductor light emitting element has excellent luminance, individual unit pixels may be configured despite even when the semiconductor light emitting element has a small size.

Regarding the size of such an individual semiconductor light emitting element, the length of each side of the device may be, for example, 80 μm or less, and the device may have a rectangular or square shape. When the semiconductor light emitting element has a rectangular shape, the size thereof may be less than or equal to 20 μm×80 μm.

In addition, even when a square semiconductor light emitting element having a side length of 10 μm is used as a unit pixel, sufficient brightness to form a display device may be obtained.

Therefore, for example, in case of a rectangular pixel having a unit pixel size of 600 μm×300 μm (i.e., one side by the other side), a distance of a semiconductor light emitting element becomes sufficiently long relatively.

Thus, in this case, it is able to implement a flexible display device having high image quality over HD image quality.

The above-described display device using the semiconductor light emitting element may be prepared by a new fabricating method. Such a fabricating method will be described with reference to FIG. 6 as follows.

Figure 6:
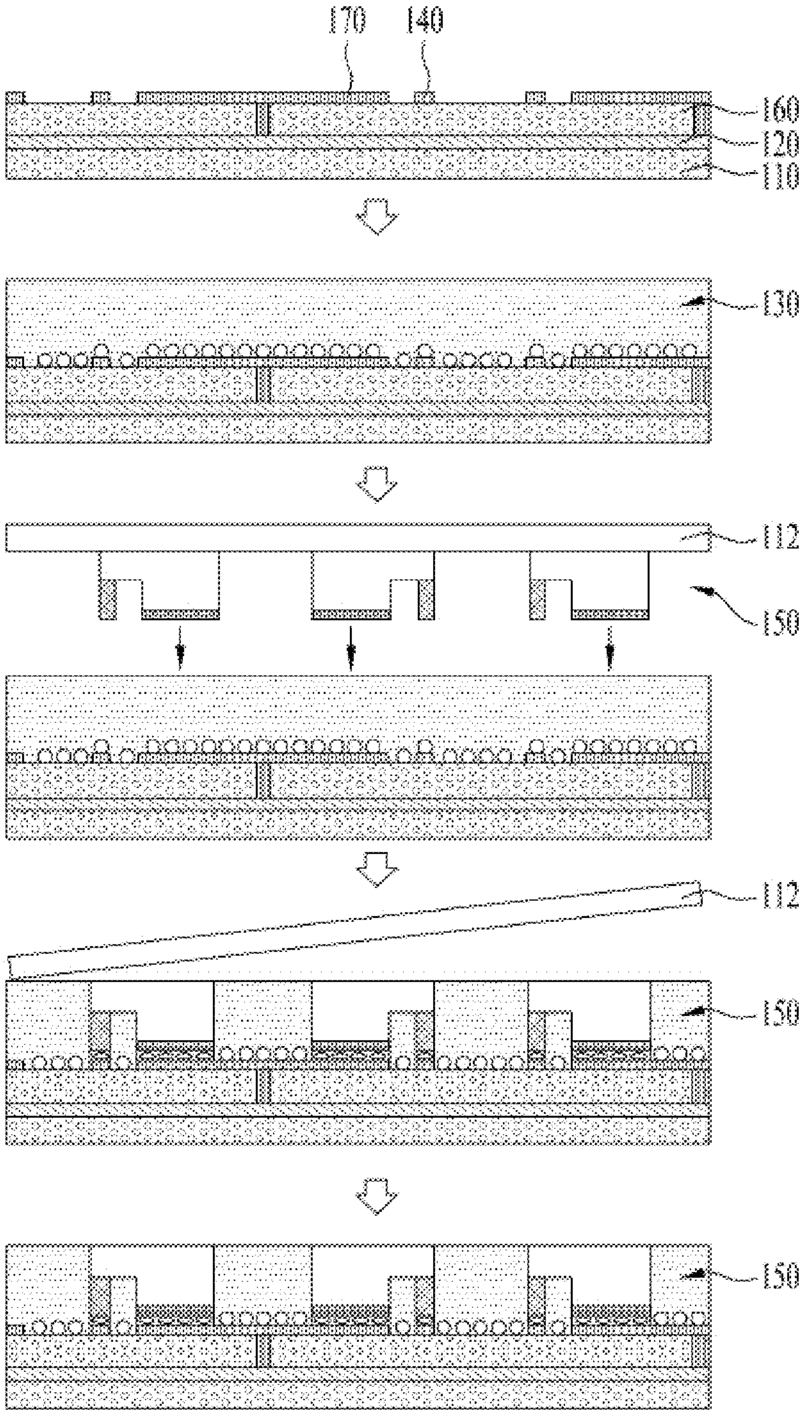
FIG. 6 shows cross-sectional views of a method of fabricating a display device using a semiconductor light emitting element according to the present disclosure.

FIG. 6 shows cross-sectional views of a method of fabricating a display device using a semiconductor light emitting element according to the present disclosure.

Referring to FIG. 6, first of all, a conductive adhesive layer 130 is formed on an insulating layer 160 located between an auxiliary electrode 170 and a second electrode 140. The insulating layer 160 is tacked on a wiring substrate 110. On the wiring substrate 110, a first electrode 120, the auxiliary electrode 170 and the second electrode 140 are disposed. In this case, the first electrode 120 and the second electrode 140 may be disposed in mutually orthogonal directions, respectively. In order to implement a flexible display device, the wiring substrate 110 and the insulating layer 160 may include glass or polyimide (PI) each.

For example, the conductive adhesive layer 130 may be implemented by an anisotropic conductive film. To this end, an anisotropic conductive film may be coated on the substrate on which the insulating layer 160 is located.

Subsequently, a temporary substrate 112, on which a plurality of semiconductor light emitting elements 150 configuring individual pixels are located to correspond to locations of the auxiliary electrode 170 and the second electrodes 140, is disposed in a manner that the semiconductor light emitting element 150 confronts the auxiliary electrode 170 and the second electrode 140.

In this regard, the temporary 112 substrate 112 is a growing substrate for growing the semiconductor light emitting element 150 and may include a sapphire or silicon substrate.

The semiconductor light emitting element is configured to have a space and size for configuring a display device when formed in unit of wafer, thereby being effectively used for the display device.

Subsequently, the wiring substrate 110 and the temporary substrate 112 are thermally compressed together. By the thermocompression, the wiring substrate 110 and the temporary substrate 112 are bonded together. Owing to the property of an anisotropic conductive film having conductivity by thermocompression, only a portion among the semiconductor light emitting element 150, the auxiliary electrode 170) and the second electrode 140 has conductivity, via which the electrodes and the semiconductor light emitting element 150 may be connected electrically. In this case, the semiconductor light emitting element 150 is inserted into the anisotropic conductive film, by which a partition may be formed between the semiconductor light emitting elements 150.

Then the temporary substrate 112 is removed. For example, the temporary substrate 112 may be removed using Laser Lift-Off (LLO) or Chemical Lift-Off (CLO).

Finally, by removing the temporary substrate 112, the semiconductor light emitting elements 150 exposed externally. If necessary, the wiring substrate 110 to which the semiconductor light emitting elements 150 are coupled may be coated with silicon oxide (SiOx) or the like to form a transparent insulating layer (not shown).

In addition, a step of forming a phosphor layer on one side of the semiconductor light emitting element 150 may be further included. For example, the semiconductor light emitting element 150 may include a blue semiconductor light emitting element emitting Blue (B) light, and a red or green phosphor for converting the blue (B) light into a color of a unit pixel may form a layer on one side of the blue semiconductor light emitting element.

The above-described fabricating method or structure of the display device using the semiconductor light emitting element may be modified into various forms. For example, the above-described display device may employ a vertical semiconductor light emitting element.

Furthermore, a modification or embodiment described in the following may use the same or similar reference numbers for the same or similar configurations of the former example and the former description may apply thereto.

Figure 7:
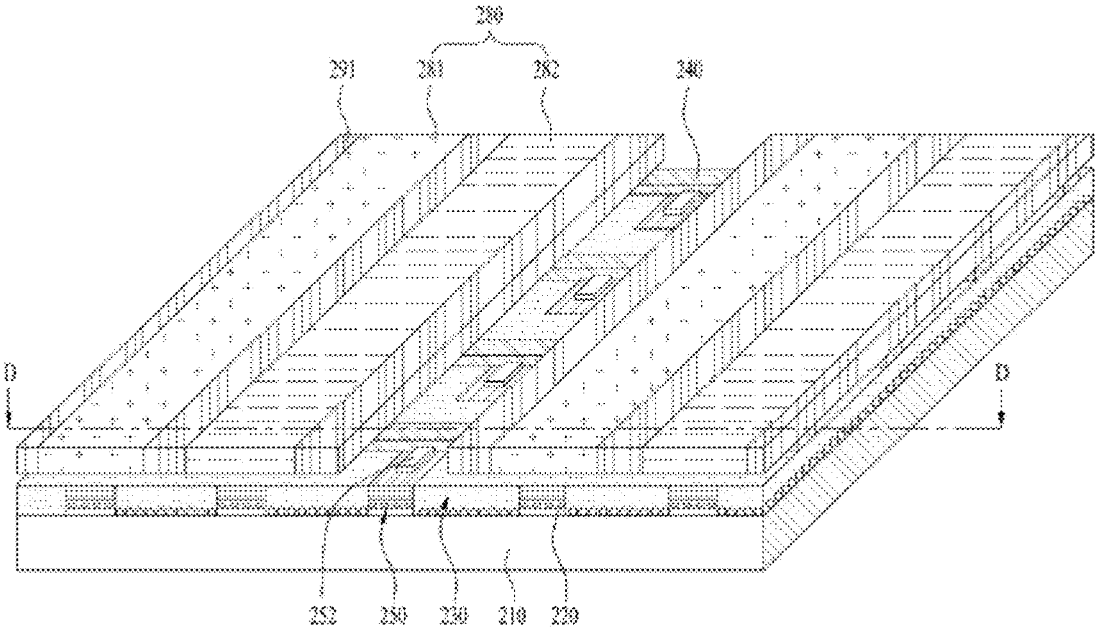
FIG. 7 is a perspective diagram of a display device using a semiconductor light emitting element according to another embodiment of the present disclosure.
Figure 8:
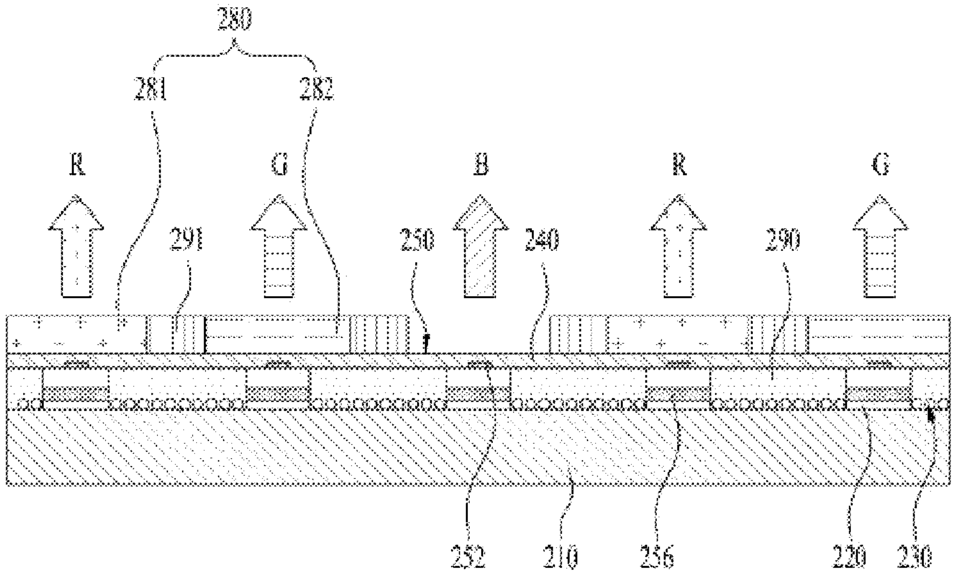
FIG. 8 is a cross-sectional diagram taken along a cutting line D-D shown in FIG. 8.
Figure 9:
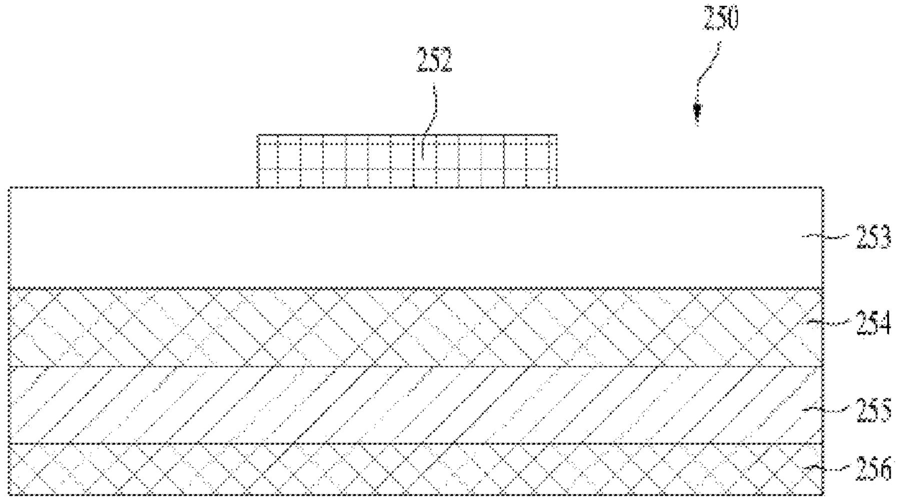
FIG. 9 is a conceptual diagram showing a vertical type semiconductor light emitting element shown in FIG. 8.

FIG. 7 is a perspective diagram of a display device using a semiconductor light emitting element according to another embodiment of the present disclosure, FIG. 8 is a cross-sectional diagram taken along a cutting line D-D shown in FIG. 8, and FIG. 9 is a conceptual diagram showing a vertical type semiconductor light emitting element shown in FIG. 8.

Referring to the present drawings, a display device may employ a vertical semiconductor light emitting device of a Passive Matrix (PM) type.

The display device includes a substrate 210, a first electrode 220, a conductive adhesive layer 230, a second electrode 240 and at least one semiconductor light emitting element 250.

The substrate 210 is a wiring substrate on which the first electrode 220 is disposed and may contain polyimide (PI) to implement a flexible display device. Besides, the substrate 210 may use any substance that is insulating and flexible.

The first electrode 210 is located on the substrate 210 and may be formed as a bar type electrode that is long in one direction. The first electrode 220 may be configured to play a role as a data electrode.

The conductive adhesive layer 230 is formed on the substrate 210 where the first electrode 220 is located. Like a display device to which a light emitting device of a flip chip type is applied, the conductive adhesive layer 230 may include one of an Anisotropic Conductive Film (ACF), an anisotropic conductive paste, a conductive particle contained solution and the like. Yet, in the present embodiment, a case of implementing the conductive adhesive layer 230 with the anisotropic conductive film is exemplified.

After the conductive adhesive layer has been placed in the state that the first electrode 220 is located on the substrate 210, if the semiconductor light emitting element 250 is connected by applying heat and pressure thereto, the semiconductor light emitting element 250 is electrically connected to the first electrode 220. In doing so, the semiconductor light emitting element 250 is preferably disposed to be located on the first electrode 220.

If heat and pressure is applied to an anisotropic conductive film, as described above, since the anisotropic conductive film has conductivity partially in a thickness direction, the electrical connection is established. Therefore, the anisotropic conductive film is partitioned into a conductive portion and a non-conductive portion.

Furthermore, since the anisotropic conductive film contains an adhesive component, the conductive adhesive layer 230 implements mechanical coupling between the semiconductor light emitting element 250 and the first electrode 220 as well as mechanical connection.

Thus, the semiconductor light emitting element 250 is located on the conductive adhesive layer 230, via which an individual pixel is configured in the display device. As the semiconductor light emitting element 250 has excellent luminance, an individual unit pixel may be configured in small size as well. Regarding a size of the individual semiconductor light emitting element 250, a length of one side may be equal to or smaller than 80 μm for example and the individual semiconductor light emitting element 250 may include a rectangular or square element. For example, the rectangular element may have a size equal to or smaller than 20 μm×80 μm.

The semiconductor light emitting element 250 may have a vertical structure.

Among the vertical type semiconductor light emitting elements, a plurality of second electrodes 240 respectively and electrically connected to the vertical type semiconductor light emitting elements 250 are located in a manner of being disposed in a direction crossing with a length direction of the first electrode 220.

Referring to FIG. 9, the vertical type semiconductor light emitting element 250 includes a p-type electrode 256, a p-type semiconductor layer 255 formed on the p-type electrode 256, an active layer 254 formed on the p-type semiconductor layer 255, an n-type semiconductor layer 253 formed on the active layer 254, and an n-type electrode 252 formed on then-type semiconductor layer 253. In this case, the p-type electrode 256 located on a bottom side may be electrically connected to the first electrode 220 by the conductive adhesive layer 230, and the n-type electrode 252 located on a top side may be electrically connected to a second electrode 240 described later. Since such a vertical type semiconductor light emitting element 250 can dispose the electrodes at top and bottom, it is considerably advantageous in reducing a chip size.

Referring to FIG. 8 again, a phosphor layer 280 may formed on one side of the semiconductor light emitting element 250. For example, the semiconductor light emitting element 250 may include a blue semiconductor light emitting element 251 emitting blue (B) light, and a phosphor layer 280 for converting the blue (B) light into a color of a unit pixel may be provided. In this regard, the phosphor layer 280 may include a red phosphor 281 and a green phosphor 282 configuring an individual pixel.

Namely, at a location of configuring a red unit pixel, the red phosphor 281 capable of converting blue light into red (R) light may be stacked on a blue semiconductor light emitting element. At a location of configuring a green unit pixel, the green phosphor 282 capable of converting blue light into green (G) light may be stacked on the blue semiconductor light emitting element. Moreover, the blue semiconductor light emitting element may be singly usable for a portion that configures a blue unit pixel. In this case, the unit pixels of red (R), green (G) and blue (B) may configure a single pixel.

Yet, the present disclosure is non-limited by the above description. In a display device to which a light emitting element of a flip chip type is applied, as described above, a different structure for implementing blue, red and green may be applicable.

Regarding the present embodiment again, the second electrode 240 is located between the semiconductor light emitting elements 250) and connected to the semiconductor light emitting elements electrically. For example, the semiconductor light emitting elements 250) are disposed in a plurality of columns, and the second electrode 240) may be located between the columns of the semiconductor light emitting elements 250.

Since a distance between the semiconductor light emitting elements 250 configuring the individual pixel is sufficiently long, the second electrode 240 may be located between the semiconductor light emitting elements 250.

The second electrode 240 may be formed as an electrode of a bar type that is long in one direction and disposed in a direction vertical to the first electrode.

In addition, the second electrode 240) and the semiconductor light emitting element 250) may be electrically connected to each other by a connecting electrode protruding from the second electrode 240. Particularly, the connecting electrode may include a n-type electrode of the semiconductor light emitting element 250. For example, the n-type electrode is formed as an ohmic electrode for ohmic contact, and the second electrode covers at least one portion of the ohmic electrode by printing or deposition. Thus, the second electrode 240 and the n-type electrode of the semiconductor light emitting element 250 may be electrically connected to each other.

Referring to FIG. 8 again, the second electrode 240 may be located on the conductive adhesive layer 230. In some cases, a transparent insulating layer (not shown) containing silicon oxide (SiOx) and the like may be formed on the substrate 210 having the semiconductor light emitting element 250) formed thereon. If the second electrode 240) is placed after the transparent insulating layer has been formed, the second electrode 240 is located on the transparent insulating layer. Alternatively, the second electrode 240 may be formed in a manner of being spaced apart from the conductive adhesive layer 230 or the transparent insulating layer.

If a transparent electrode of Indium Tin Oxide (ITO) or the like is sued to place the second electrode 240) on the semiconductor light emitting element 250), there is a problem that ITO substance has poor adhesiveness to an n-type semiconductor layer. Therefore, according to the present disclosure, as the second electrode 240) is placed between the semiconductor light emitting elements 250, it is advantageous in that a transparent electrode of ITO is not used. Thus, light extraction efficiency can be improved using a conductive substance having good adhesiveness to an n-type semiconductor layer as a horizontal electrode without restriction on transparent substance selection.

Referring to FIG. 8 again, a partition 290) may be located between the semiconductor light emitting elements 250. Namely, in order to isolate the semiconductor light emitting element 250 configuring the individual pixel, the partition 290) may be disposed between the vertical type semiconductor light emitting elements 250. In this case, the partition 290 may play a role in separating the individual unit pixels from each other and be formed with the conductive adhesive layer 230 as an integral part. For example, by inserting the semiconductor light emitting element 250 in an anisotropic conductive film, a base member of the anisotropic conductive film may form the partition.

In addition, if the base member of the anisotropic conductive film is black, the partition 290 may have reflective property as well as a contrast ratio may be increased, without a separate block insulator.

For another example, a reflective partition may be separately provided as the partition 190. The partition 290 may include a black or white insulator depending on the purpose of the display device.

In case that the second electrode 240 is located right onto the conductive adhesive layer 230 between the semiconductor light emitting elements 250, the partition 290 may be located between the vertical type semiconductor light emitting element 250 and the second electrode 240 each. Therefore, an individual unit pixel may be configured using the semiconductor light emitting element 250. Since a distance between the semiconductor light emitting elements 250 is sufficiently long, the second electrode 240 can be placed between the semiconductor light emitting elements 250. And, it may bring an effect of implementing a flexible display device having HD image quality.

In addition, as shown in FIG. 8, a black matrix 291 may be disposed between the respective phosphors for the contrast ratio improvement. Namely, the black matrix 291 may improve the contrast between light and shade.

The present disclosure, which applies calibration to each cell in the above-described display device to which an LED is applied, will be described below with reference to FIGS. 10 to 19.

Figure 10:
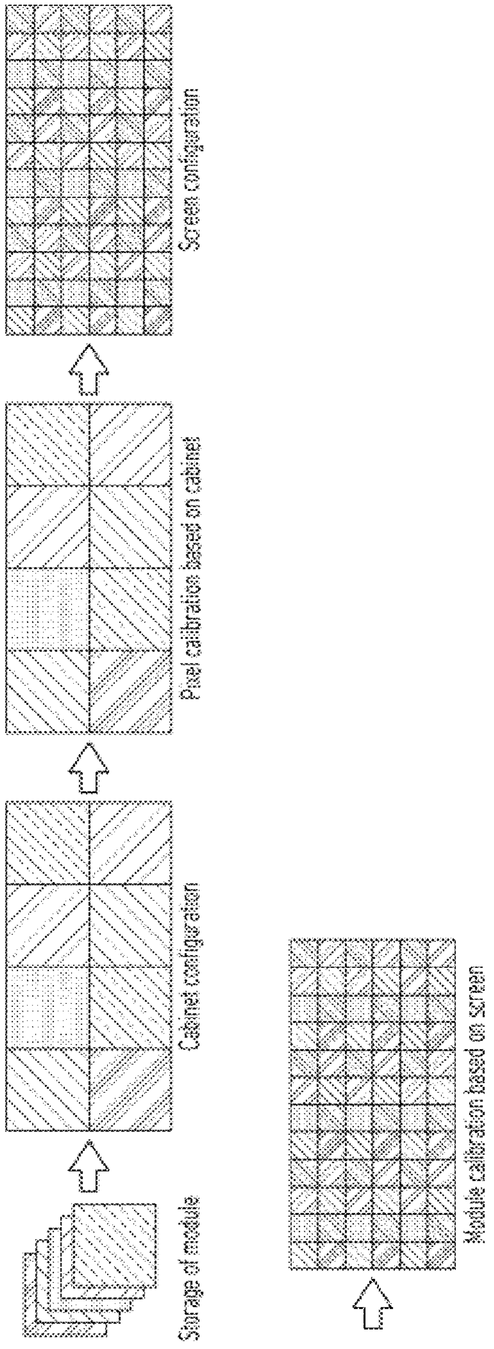
FIG. 10 illustrates a process of producing an LED display device according to an embodiment of the present disclosure.

FIG. 10 illustrates a process of producing an LED display device according to an embodiment of the present disclosure. Hereinafter, an entire process of assembling an LED display device (e.g., a TV, a monitor, signage, etc.) will be briefly described with reference to FIG. 10.

First, a module illustrated in FIG. 10 is composed of a plurality of pixels. A pixel is also called a dot. Therefore, a diode, which is the most basic unit of the LED display device, constitutes the pixel (dot).

Furthermore, a plurality of modules is combined to form one cabinet. Then, one screen is completed by combining multiple cabinets. Here, the screen refers to an entire screen of a finished TV, monitor, signage, etc.

Meanwhile, all display devices such as an OLED, an LCD, and an LED need to be subjected to calibration. In this specification, calibration means, for example, a process of adjusting screen color to the standard set by a color model of red, green, and blue (RGB).

The reason why such calibration is necessary is that color coordinates (color temperature) change as the display device is used as compared to initial setting. Further, calibration is necessary because tone reproduction characteristics (gamma curve) may be distorted.

However, according to the prior art, an average RGB value has been measured based on a module and RGB gain of the module has been adjusted to minimize a difference in color and luminance between modules (surfaces). More specifically, for example, a reference module has been determined as a criterion, and a process of adjusting an RGB gain value of each module, measuring RGB values of each module, and comparing RGB values of modules has been repeated until a difference between an average RGB value of the reference module and an average RGB value of each module is a predetermined value or less.

However, according to the prior art, since the average RGB value for one module is used, there is a limitation in that a problem occurring when a color difference is large even within one module is not solved. An example related to this issue will be described in more detail with reference to FIG. 11 below.

Figure 11:
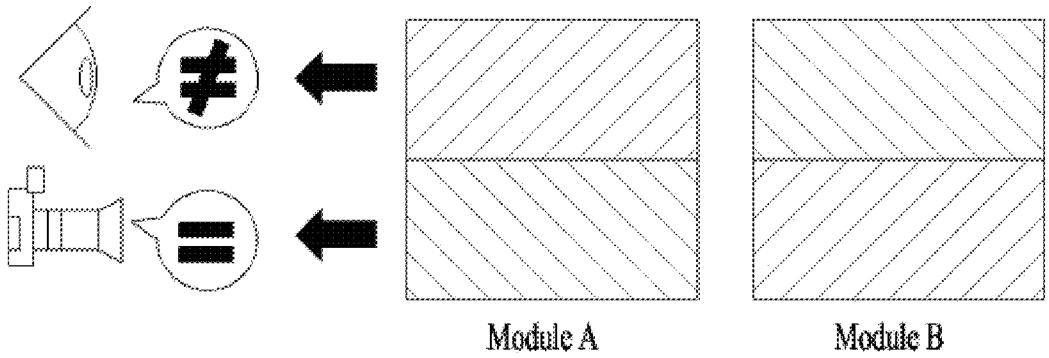
FIG. 11 is a diagram for comparative explanation of the case in which colors of modules are perceived differently between a camera and a user.

FIG. 11 is a diagram for comparative explanation of the case in which colors of modules are perceived differently between a camera and a user.

First, people generally are incapable of distinguishing between pixels, which are the smallest units constituting the LED display device.

However, even ordinary people may sufficiently perceive a color difference between modules constituting the LED display device.

For example, it is assumed that an upper portion of module A illustrated in FIG. 11 has a dark blue color, while a lower portion of module A has a light blue color. In contrast, it is assumed that an upper portion of module B illustrated in FIG. 11 has a light blue color, while a lower portion of module B has a dark blue color.

In this case, a user (human) may recognize module A and module B as modules with different color differences. However, since the camera uses an average RGB value of each module, there is a problem of recognizing the dark blue color and the light blue color as the same color (trap of an average value).

An embodiment of the present disclosure for solving such an issue will now be described below with reference to FIG. 12.

Figure 12:
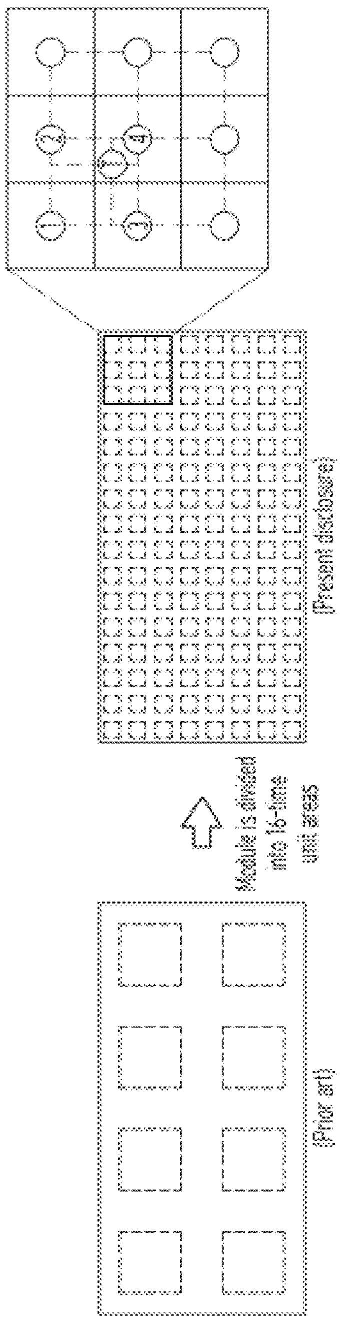
FIG. 12 illustrates a process of extracting a cell to be calibrated according to an embodiment of the present disclosure.

FIG. 12 illustrates a process of extracting a cell to be calibrated according to an embodiment of the present disclosure.

To solve the problems of calibration performed based on a module in the prior art, the present disclosure introduces calibration performed based on a cell. In order to overcome the limitations of module-level calibration according to the prior art, a module is further divided and then calibration is performed based on the cell. Meanwhile, a process of determining an optimal size of the cell will be described in more detail below with reference to FIG. 14.

As illustrated in FIG. 12, one LED display module (LDM) is divided into 6 cells and calibration is performed on each cell. Then, the problem of a color difference between modules may be solved.

Furthermore, another feature of the present disclosure is additionally applying a compensation algorithm (e.g., anti-aliasing) for compensating for a color difference between cell areas when a module is divided into 16 cells.

Figure 13:
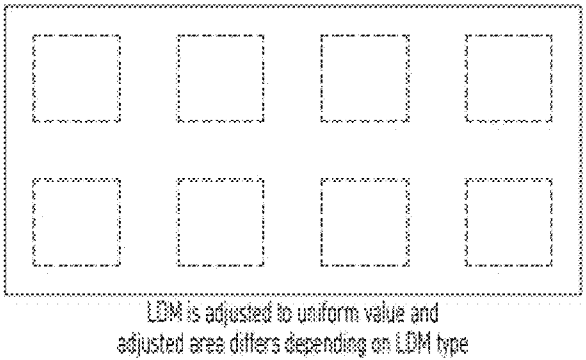
FIG. 13 illustrates the prior art in which calibration is performed based on an LDM and the present disclosure in which calibration is performed based on a cell.
Figure 13:
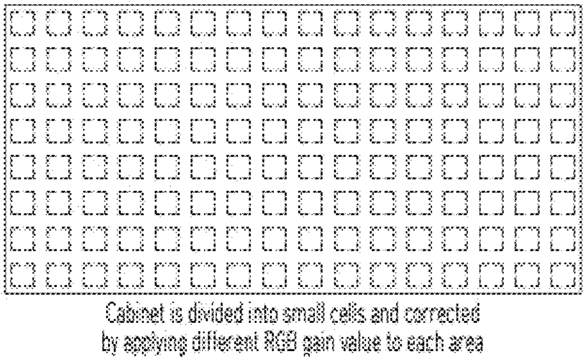

FIG. 13 illustrates the prior art for performing calibration based on an LDM and the present disclosure for performing calibration based on a cell.

As described above, according to the prior art, calibration has been performed only based on an LDM. In other words, an entire LDM module has been adjusted to one representative RGB gain value.

According to the prior art, a problem occurs when an RGB value of a center portion and an RG value of an outer portion within one LDM module are different. In other words, if RGB gain is adjusted using an average RGB value of one LDM module, there may be modules that the user perceives as having a color difference even if the average RGB value of the modules is the same.

To solve the problem of the prior art, an embodiment of the present disclosure introduces calibration based on a cell. An inter-plane calibration adjustment unit area is set to be smaller than an LDM but larger than a pixel. Depending on an LDM configuration, the LDM is divided into 16×8 or 16×9 cells, and calibration is applied to each cell.

(a) of FIG. 13 illustrates the case in which calibration is performed based on an LDM according to the prior art. One LDM is adjusted to a uniform value.

In contrast, (b) of FIG. 13 illustrates the case in which calibration is performed based on a cell according to an embodiment of the present disclosure. A cabinet is divided into small cells and a different RGB gain value is applied to each cell area. Therefore, the advantage of users being less aware of a color difference is expected.

As described above, according to an embodiment of the present disclosure, calibration is performed based on a cell for the LED display device.

First, as illustrated in FIG. 10, one module including a plurality of pixels is provided, a cabinet including a plurality of modules is provided, and the LED display device (screen) including a plurality of cabinets is provided.

Furthermore, as illustrated in FIGS. 12 and 13, calibration is designed to be performed based on a cell that is larger than the size of a pixel and smaller than the size of one module.

Here, a process of deriving an optimized size of the cell will be described later with reference to FIG. 14.

Figure 14:
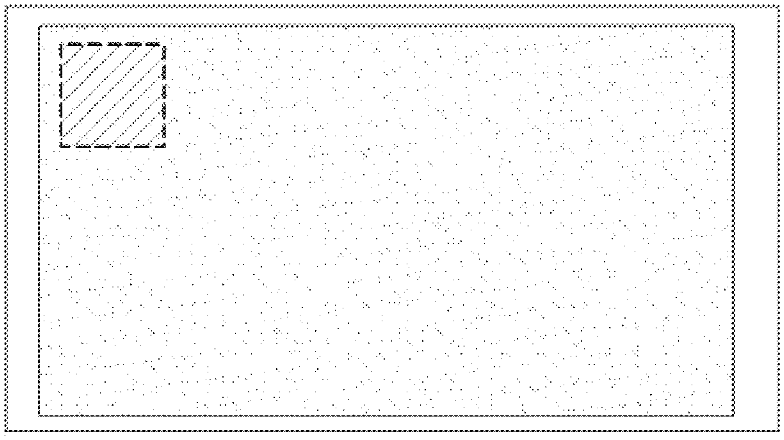
FIG. 14 illustrates a process of deriving an optimized size of a cell to be calibrated according to an embodiment of the present disclosure.
Figure 14:
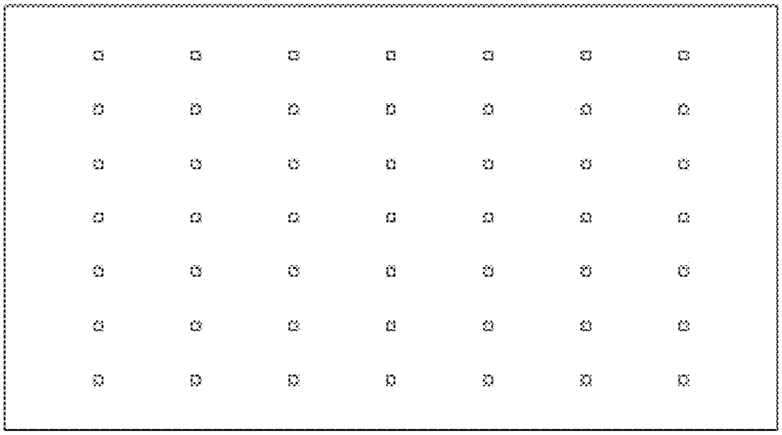

FIG. 14 illustrates a process of deriving an optimized size of a cell to be calibrated according to an embodiment of the present disclosure.

As illustrated in (a) of FIG. 14, the size of a cell to be calibrated is determined through analysis of a measurement area of the LED display device and analysis of a structure of an LDM. First, one LDM is basically divided into 128 (=16×8) or 144 (=16×9) cell blocks.

Furthermore, according to another embodiment of the present disclosure, the size of the cell, which is a basic unit of calibration, is determined by at least one camera.

For example, the size of the cell, which is the basic unit of calibration, is flexibly changed by resolution of a camera, an angle of view of a lens of the camera, or a screen area of the LED display device captured by the camera. As illustrated in (b) of FIG. 14, representative cells of each cabinet are illuminated to confirm the measurement area.

More specifically, as the resolution of the camera increases, the size of the cell, which is the basic unit of calibration, becomes smaller.

Meanwhile, as the angle of view of the lens of the camera increases, the size of the cell, which is the basic unit of calibration, becomes smaller.

In addition, as the screen area of the LED display device increases, the size of the cell, which is the basic unit of calibration, increases.

Meanwhile, another feature of the present disclosure is to determine the size of the cell by installing a camera at the position of a user who mainly views the LED display device to which an embodiment of the present disclosure is applied. Alternatively, the position of a camera may be fixed, and a camera with higher resolution may be used as the position of a user who mainly views the LED display device is further away from the LED display device.

Figure 15:
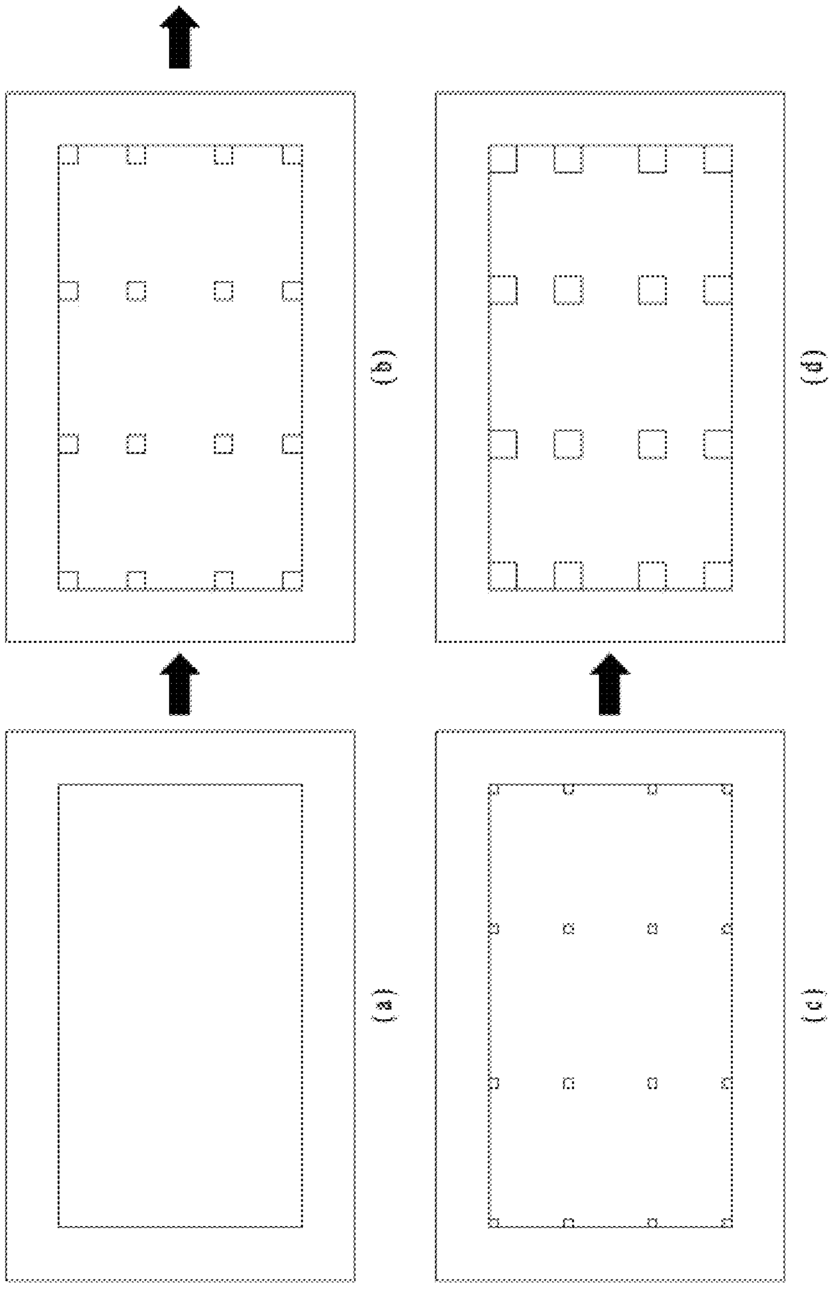
FIG. 15 illustrates a process of finely adjusting a cell according to an embodiment of the present disclosure.

FIG. 15 illustrates a process of finely adjusting a cell according to an embodiment of the present disclosure. An embodiment of finely adjusting a position will now be described with reference to FIG. 15 under the assumption that the size of the cell to be calibrated has been determined as described previously with reference to FIG. 14.

For the size of the cell determined in FIG. 14, the LED display device is captured through a camera while additionally finely adjusting the size of the cell as illustrated in FIG. 15. Then, after comparing captured data, an optimal fine area is precisely set.

Figure 16:
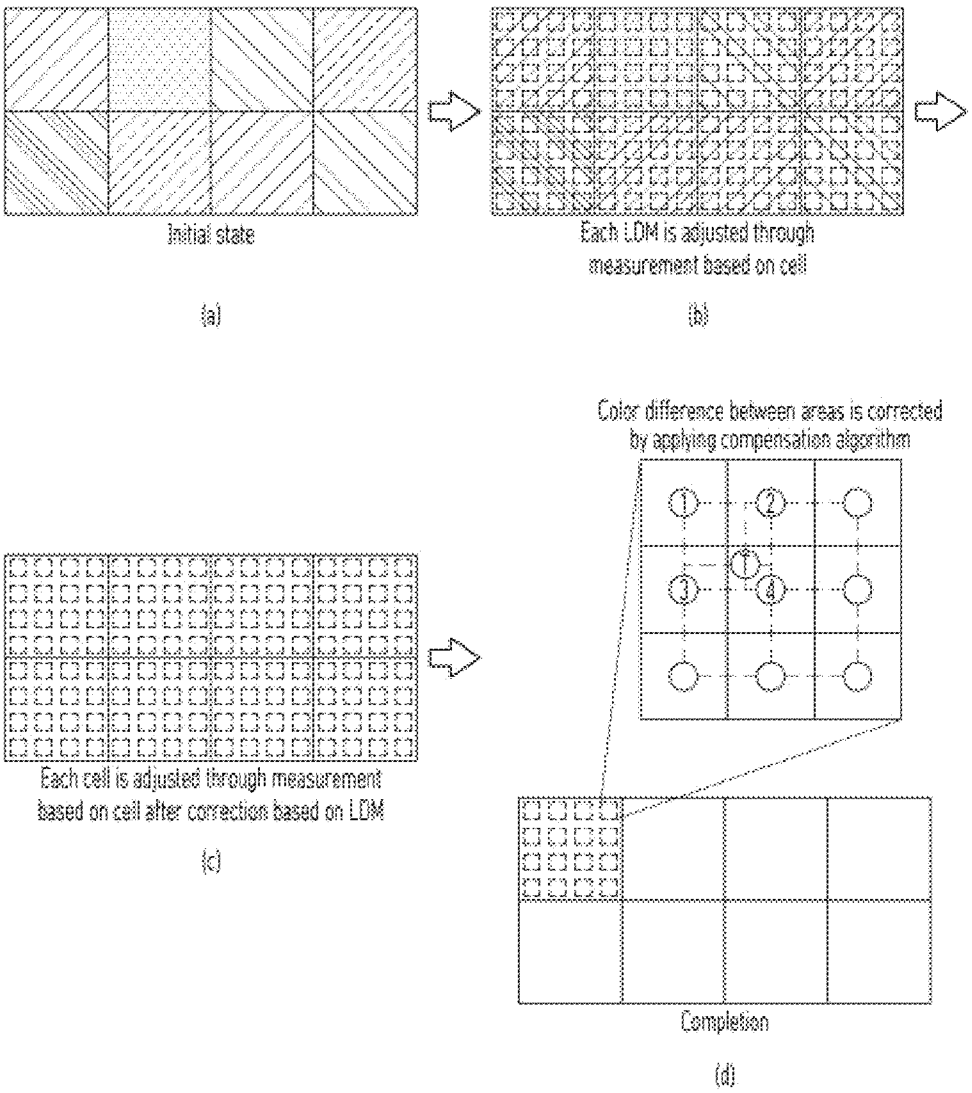
FIG. 16 illustrates a process of varying a correction range according to an embodiment of the present disclosure.

FIG. 16 illustrates a process of varying a correction range according to an embodiment of the present disclosure. Hereinafter, an embodiment in which the correction range is varied after capturing a measured area through a camera will now be described with reference to FIG. 16.

(a) of FIG. 16 illustrates an initial state. As illustrated in (b) of FIG. 16, each LDM is adjusted through measurement based on a cell.

As illustrated in (c) of FIG. 16, after performing correction based on the LDM, each cell is adjusted through measurement based on the cell. As illustrated in (d) of FIG. 16, a color difference between cell areas is corrected through a compensation algorithm.

Figure 17:
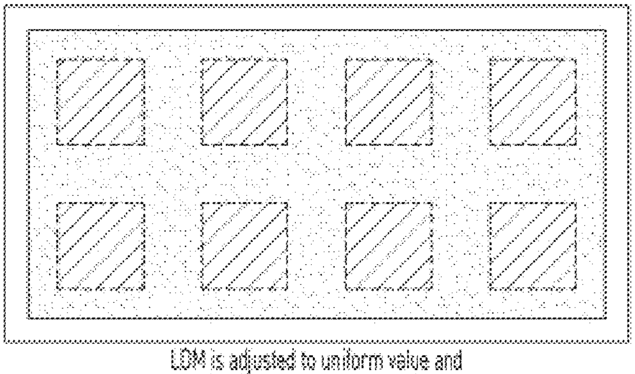
FIG. 17 illustrates a result of the prior art in which calibration is performed based on an LDM and a result of the present disclosure in which calibration is performed based on a cell.
Figure 17:
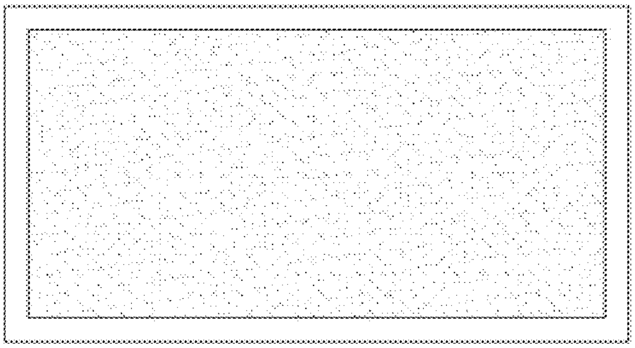

FIG. 17 illustrates a result of the prior art in which calibration is performed based on an LDM and a result of the present disclosure in which calibration is performed based on a cell.

(a) of FIG. 17(*a*) illustrates the result of calibration based on an LDM according to the prior art. As illustrated in (a) of FIG. 17, the LDM is adjusted to a uniform value and an adjusted area differs depending on an LDM type.

In contrast, (b) of FIG. 17 illustrates the result of calibration performed based on a cell according to an embodiment of the present disclosure. As illustrated in (b) of FIG. 17, a cabinet is divided into small cells and corrected by applying a different RGB gain value to each cell area.

Therefore, as compared with (a) of FIG. 17, (b) of FIG. 17 has a technical effect of providing a more uniform screen as a whole.

Figure 18:
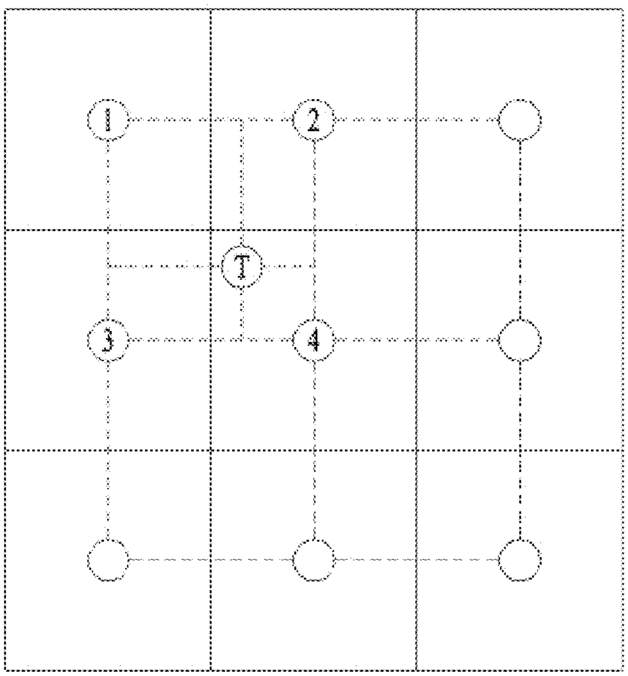
FIG. 18 illustrates the case in which anti-aliasing is applied through interpolation between cells according to an embodiment of the present disclosure.

FIG. 18 illustrates the case in which anti-aliasing is applied through interpolation between cells according to an embodiment of the present disclosure.

An LED cabinet is divided into 128 (=16×8) pieces and a field programmable gate array (FPGA) function that may adjust the brightness and color temperature of each piece is added. Further, after final installation of the LED display device, additional adjustment is performed to ensure the best picture quality at an eye level of a user.

Meanwhile, as illustrated in FIG. 18, an anti-aliasing function is additionally applied through interpolation so that a level difference for each cell (block) is not recognized by the eyes of the user.

Figure 19:
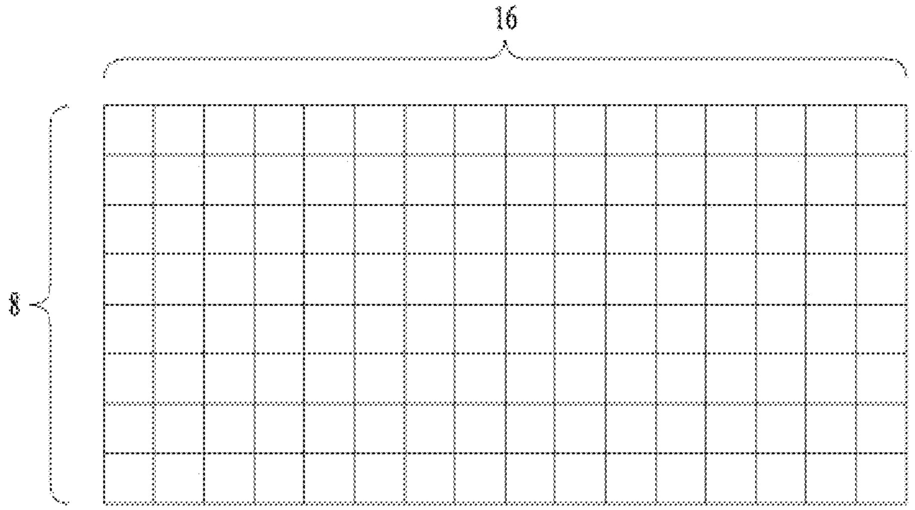
FIG. 19 illustrates a process of dividing one cabinet into a specific number of cells, according to an embodiment of the present disclosure.

FIG. 19 illustrates a process of dividing one cabinet into a specific number of cells, according to an embodiment of the present disclosure.

As illustrated in FIG. 19, the cabinet is divided into 128 areas (cells) and an RGB value of each area (cell) is corrected. On the other hand, in the prior art, there was a problem in calculating an average value of the entire module and collectively applying the average value to the entire module.

When designed in this way, there are the following technical effects are obtained in terms of product use and maintenance/repair.

First, a description will be given in terms of product use.

The prior art has problems of causing a slight color difference between modules when playing a video using the LED display device and causing a color difference between modules when the LED display device is used for PPT, etc. in a conference room.

In contrast, according to an embodiment of the present disclosure, there are technical effects in that there is almost no color difference between modules when the LED display device is used to play a video or when the LED display device is used for PPT in a conference room.

Next, a description will be given in terms of maintenance/repair.

The prior art has a problem of requiring re-correction based on the entire module when a W/B error occurs, which increases costs, and a problem of requiring professional tuning by an image quality expert.

In contrast, according to one embodiment of the present disclosure, when the W/B error occurs, re-correction may be performed on a micro-area basis, which has the advantage of reducing costs and tuning may be performed at a service engineer level.

When the present disclosure is implemented as a device invention, the LED display device includes one module including a plurality of pixels, a cabinet including a plurality of modules, and a screen including a plurality of cabinets.

Here, a feature of the present disclosure is that calibration is performed based on a cell that is larger than the size of the pixel and smaller than the size of a single module.

While an LED, a display device including the LED, and a manufacturing method thereof according to the embodiments of the present disclosure have been described above as specific embodiments, this is purely exemplary and the present disclosure is not limited thereto. The present disclosure should be interpreted as having the broadest scope according to the technical idea disclosed in the present specification.

A person skilled in the art may combine and substitute the disclosed embodiments to implement embodiments not specified, but this also does not deviate from the scope of the present disclosure. In addition, a person skilled in the art may easily change or modify the embodiments disclosed based on the present specification, and it is clear that such changes or modifications also fall within the scope of the present disclosure.

MODE FOR INVENTION

Various embodiments have been described hereinabove in the best mode for carrying out the present disclosure.

INDUSTRIAL APPLICABILITY

The LED, the display device including the LED, and the manufacturing method thereof according to the embodiments of the present disclosure have industrial applicability.

The invention claimed is:

1. A method of performing calibration on a light-emitting diode (LED) display device, the method comprising:
- providing one module including a plurality of pixels;
- providing a cabinet including a plurality of modules;
- providing the LED display device including a plurality of cabinets; and
- performing calibration based on a cell which is larger than a size of a pixel and smaller than a size of the one module,
- wherein a size of the cell, which is a basic unit of the calibration, is determined by at least one camera.

2. The method of claim 1, wherein 128 (=16×8) or 144 (=16×9) cells each serving as a basic unit of the calibration are included in the one module.

3. The method of claim 1, wherein the size of the cell, which is the basic unit of the calibration, is changed by a resolution of the camera, an angle of view of a lens of the camera, or a screen area of the LED display device captured by the camera.

4. The method of claim 3, wherein the size of the cell, which is the basic unit of the calibration, becomes smaller as the resolution of the camera increases.

5. The method of claim 3, wherein the size of the cell, which is the basic unit of the calibration, becomes smaller as the angle of view of the lens of the camera increases.

6. The method of claim 3, wherein the size of the cell, which is the basic unit of the calibration, increases as the screen area of the LED display device increases.

7. A light-emitting diode (LED) display device, comprising:
- one module including a plurality of pixels;
- a cabinet including a plurality of modules; and
- one screen including a plurality of cabinets,
- wherein calibration is performed based on a cell which is larger than a size of a pixel and smaller than a size of the one module, and
- wherein a size of the cell, which is a basic unit of the calibration, is determined by at least one camera.

8. The LED display device of claim 7, wherein 128 (=16×8) or 144 (=16×9) cells each serving as a basic unit of the calibration are included in the one module.

9. The LED display device of claim 7, wherein the size of the cell, which is the basic unit of the calibration, is changed by a resolution of the camera, an angle of view of a lens of the camera, or a screen area of the LED display device captured by the camera.

10. The LED display device of claim 9, wherein the size of the cell, which is the basic unit of the calibration, becomes smaller as the resolution of the camera increases.

11. The LED display device of claim 9, wherein the size of the cell, which is the basic unit of the calibration, becomes smaller as the angle of view of the lens of the camera increases.

12. The LED display device of claim 9, wherein the size of the cell, which is the basic unit of the calibration, increases as the screen area of the LED display device increases.

* * * * *